(12) United States Patent
Alves

(10) Patent No.: US 11,491,726 B2
(45) Date of Patent: Nov. 8, 2022

(54) METHOD FOR THE TREATMENT OF RESIDUAL THERMOPLASTIC POWDERS

(71) Applicant: Ford Global Technologies, LLC, Dearborn, MI (US)

(72) Inventor: Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 16/815,656

(22) Filed: Mar. 11, 2020

(65) Prior Publication Data
US 2020/0290280 A1     Sep. 17, 2020

(30) Foreign Application Priority Data
Mar. 11, 2019   (DE) .......................... 102019203285.0

(51) Int. Cl.
| | | |
|---|---|---|
| *B29C 64/357* | (2017.01) | |
| *B29B 17/00* | (2006.01) | |
| *B29B 9/08* | (2006.01) | |
| *B33Y 40/00* | (2020.01) | |
| *B29C 64/153* | (2017.01) | |
| *B29C 64/255* | (2017.01) | |
| *B33Y 30/00* | (2015.01) | |
| *B33Y 10/00* | (2015.01) | |

(52) U.S. Cl.
CPC .............. *B29C 64/357* (2017.08); *B29B 9/08* (2013.01); *B29B 17/0005* (2013.01); *B29C 64/153* (2017.08); *B29C 64/255* (2017.08); *B33Y 10/00* (2014.12); *B33Y 30/00* (2014.12); *B33Y 40/00* (2014.12)

(58) Field of Classification Search
CPC ... B29B 9/08; B29B 17/0005; B29B 17/0026; B29B 17/0036; B29C 64/357; B29C 64/314; B30B 11/12; B30B 11/16; B30B 11/165
See application file for complete search history.

(56) References Cited

U.S. PATENT DOCUMENTS

| | | | |
|---|---|---|---|
| 6,146,560 A | 11/2000 | Behi et al. | |
| 6,284,186 B1 | 9/2001 | Hansen | |
| 6,544,452 B1 * | 4/2003 | Stevens | ..................... B29B 9/08 |
| | | | 264/109 |

(Continued)

FOREIGN PATENT DOCUMENTS

BG            111500        12/2015

*Primary Examiner* — Mary Lynn F Theisen
(74) *Attorney, Agent, or Firm* — Burris Law, PLLC

(57) ABSTRACT

A method for the treatment of residual thermoplastic powder from an additive manufacturing process includes, in one step of the process, a powder that includes the residual powder is provided and compressed into granules as raw material for a primary shaping process. A pressing apparatus with two roller elements rotating in opposite directions and having lateral surfaces adjacent to one another in a pressing area is used to compress the powder into the granules. The lateral surfaces each having a plurality of molding elements assigned to one another in pairs such that the powder is compressed into granules in the pressing area. A cam mechanism positioned within one of the roller elements and configured to deflect the plurality of molding elements radially as a function of an angle of rotation of the roller element can be included.

18 Claims, 3 Drawing Sheets

(56) References Cited

U.S. PATENT DOCUMENTS

| | | |
|---|---|---|
| 8,185,229 B2 | 5/2012 | Davidson |
| 2004/0012114 A1* | 1/2004 | Eyerer ................... B29B 9/14 264/117 |
| 2006/0214335 A1* | 9/2006 | Cox ...................... B01F 23/69 425/375 |
| 2008/0300353 A1 | 12/2008 | Monsheimer et al. |

* cited by examiner

METHOD FOR THE TREATMENT OF RESIDUAL THERMOPLASTIC POWDERS

CROSS-REFERENCE TO RELATED APPLICATIONS

This application claims priority to and the benefit of German Patent Application No. 102019203285.0 filed on Mar. 11, 2019. The disclosure of the above application is incorporated herein by reference.

FIELD

The present disclosure relates to a method for the treatment of residual thermoplastic powders.

BACKGROUND

The statements in this section merely provide background information related to the present disclosure and may not constitute prior art.

Various processes currently exist by means of which, on the basis of design data, three-dimensional models can be produced from shapeless or shape-neutral materials such as powders (possibly with the addition of a binder) or liquids (sometimes also including molten solids). These processes are also known under collective terms such as "rapid prototyping," "rapid manufacturing" or "rapid tooling." In this case, a primary shaping step is often carried out, in which the starting material is either present in liquid form from the outset or is liquefied in the meantime and cures at an intended location. One known process in this case is fused deposition modeling (FDM), in which a workpiece is built up in layers from thermoplastic material. The plastics material is fed for example in the form of a powder or a strand, is melted and applied in molten form by a print head, which successively applies individual, generally horizontal layers of the object to be produced.

Also known are processes in which a pulverulent material, for example a plastics material, is applied in layers and selectively cured by means of a locally applied or printed-on binder. In yet other processes, for example selective laser sintering (SLS), a powder is applied in layers, for example using a doctor blade, to a base plate. The powder is selectively heated by means of suitable focused radiation, for example a laser beam, and as a result sintered. After a layer has been built up, the base plate is lowered slightly and a new layer is applied. In addition to plastics materials, it is also possible to use ceramics or metals as the powder. The non-sintered powder is removed after the production process. In a similar process, selective laser melting (SLM), the amount of energy introduced by the radiation is so high that the powder is regionally melted and solidifies into a coherent solid body. This process is used in particular in the case of metal powders.

In the powder-based processes, issues arise regarding further use of the residual powders that are not part of the finished object. The residual powders can sometimes be reused in the additive manufacturing process, as long as their chemical and physical properties have not changed or have changed only to an insignificant extent. However, it is possible, for example in SLS, for powder particles that have been exposed to increased temperatures in the vicinity of the laser beam without actually being sintered to have altered properties that make them unfit for direct reuse. Even partial sintering of powder particles makes them unsuitable for reuse, it not being possible to build up smooth powder layers therewith.

In principle, such residual powders can be used for example in plastics processing. However, for this purpose, the residual powders are first converted into a granular form, to which end the residual powders are melted and cooled down again for example with water. This is energy- and cost-intensive, however, and the melting impairs the material properties of the plastics material. Furthermore, when cooling down with water, moisture collects or accumulates in the granules, likewise impairing the properties thereof.

BG 111500 A discloses a process for the reuse of residual toner for photocopiers or printers. The residual toner can be mixed with various other substances, for example solvents or additives, and be used for example as corrosion inhibitors for metals. Alternatively, they can be used in injection molding after extrusion, granulation or tableting.

U.S. Pat. No. 8,185,229 B2 shows a 3D printer having a build chamber into which powder is introduced in layers during the printing operation. An underlying surface for the powder is constructed from two plates located one above the other, which each having openings. Arranged beneath the plates is a vacuum source. Using the vacuum, excess powder can be aspirated and returned into a storage container, with the result that the excess powder can be used in a further 3D print.

U.S. Pat. No. 6,146,560 A discloses a process for producing an object, in which a mixture is produced that exhibits a reused ceramic powder made from a ceramic object, a dispersant, a pH regulator, a biocide, a gel-forming material, and a carrier. The mixture is blended in another mixture at increased temperature under the action of shear forces, in order to create a molding compound. An object is produced from the molding compound by primary shaping at increased temperature and pressure.

U.S. Pat. No. 6,284,186 B1 describes a process for using reused glass powder as a filler in molded plastics parts. In that case, reused glass powder is combined with a plastics material, wherein the glass powder can make up as much as 80 percent by weight of the composition. The composition can be used for various processes, such as injection molding, extrusion or blow molding, for example.

US 2008/0300353 A1 discloses a sinter powder that exhibits a polyamide and metal soaps. The powder is intended to be used in selective laser sintering. The addition of the metal soaps results in improved mechanical properties of the produced workpieces and in improved reusability of residual powder that is left over in the production process.

In light of the above indicated references, there is still room for improvement in the utilization of residual powder that arises in additive manufacturing processes such as selective laser sintering, for example. In particular, it would be desirable to utilize the residual powder that cannot be used again in the additive manufacturing process.

SUMMARY

This section provides a general summary of the disclosure and is not a comprehensive disclosure of its full scope or all of its features. It is to be pointed out that the features and measures specified individually in the following description can be combined with one another in any desired technically meaningful way and disclose further forms of the present disclosure. The description, in particular in conjunction with the figures, characterizes and specifies the present disclosure further.

It should be noted that the features and measures specified individually in the following description can be combined with one another in any desired technically meaningful way and disclose further forms or variations of the present disclosure. The description additionally characterizes and specifies the present disclosure, in particular in conjunction with the figures.

In one form of the present disclosure a method for the treatment of residual thermoplastic powder (also referred to herein simply as 'residual powder") from an additive manufacturing process is provided. The residual powder is at least partially thermoplastic, i.e. it exhibits at least one thermoplastic material, optionally also a mix or mixture of thermoplastic materials. In particular polyamides are suitable as such materials. In addition, it is also possible for further, non-thermoplastic materials to be contained. For example, color particles or fillers, for example glass fibers, can be contained. Different grain sizes of the powder may be provided. In at least one variation, the grain size is less than 0.1 mm. If powder particles are agglomerated in the course of the additive manufacturing process, for example by partial sintering, the agglomerates in question can also have larger dimensions.

In one step of the process, a powder that exhibits the residual powder is provided. In other words, the residual powder forms at least a part of the powder. Optionally, the residual powder can be treated, for example agglomerates can be partially broken up.

In a further step, the powder is compressed into granules as raw material for a primary shaping process. This compressing can be carried out by means of a pressing apparatus. In this connection, it is also possible to speak of compression molding, in which, under the action of pressure, cohesion of powder particles is produced and also the shape of the granule thus formed is defined.

Granules are understood in this connection to be a granular material, wherein the shape of the individual grains is not defined. They can be designed for example in a spherical, cylindrical, polygonal or amorphous manner. The size of the grains of the granules is not defined in this connection either. However, in some variations of the present disclosure, a largest dimension of the grains is between 0.5 mm and 10 mm. Both the shape and the size of the individual grains of the granules can be uniform or nonuniform. Each of the grains of the granules consists at least partially of a thermoplastic material, optionally also of a mixture of thermoplastic materials, since it is manufactured by compressing the powder.

The compression can take place using various pressing apparatuses, in particular using a pressing apparatus that has two roller elements, which rotate in opposite directions, the lateral surfaces of which are adjacent to one another in a pressing area and which each laterally have a plurality of molding elements that are assigned to one another in pairs and compress powder into granules in the pressing area. Each of the roller elements (which are also referred to in the following text as first and second roller element) rotates about a respective axis of rotation. The axes of rotation extend generally parallel to one another, but can also extend for example at an angle of up to 45° or up to 30° to one another. In at least one variation of the present disclosure, the axes of rotation extend horizontally, that is to say at an angle of 90° to the acting direction of gravity, although deviations are possible here, too. In at least one variation, each of the axes of rotation is inclined at less than 30° to the horizontal plane. The roller elements rotate at an identical speed, i.e. synchronously in opposite directions to one another.

The lateral surfaces, that is to say the external surfaces of the two roller elements with respect to the particular axis of rotation, are arranged adjacently to one another in a pressing area and the pressing area is that area in which the lateral surfaces of the roller elements are at the smallest distance from one another. The term "roller element" should not be interpreted as being limiting in this regard. In some variations, a roller- or roll-like shape of the roller elements with the lateral surface designed to be entirely or partially rotationally symmetric with respect to the particular axis of rotation is desired. However, this does not have to be the case.

Each of the roller elements has a plurality of molding elements positioned laterally (i.e., positioned in the region of the lateral surface). The molding elements of each roller element can be distributed around the entire circumference of the lateral surface, wherein they may typically be offset and in particular spaced apart from one another. The molding elements of each roller element can be formed so as to be identical to or different than one another. The molding elements are assigned to one another in pairs and compress powder into granules in the pressing area. In other words, a first molding element of the first roller element is assigned to a second molding element of the second roller element and the positions of these two molding elements (and other pairs of molding elements) and the rotary movements of the roller elements are coordinated with one another such that the molding elements are located opposite one another in the pressing area, such that a molding cavity for the granules to be produced is formed between the molding elements in the pressing area, and the powder is compressed into granules in said molding cavity. As will be discussed further below, the cavity can also be partially formed by further parts of the apparatus. The molding elements in this case at least partially define the shape of the granules to be produced. In each case two molding elements can mold exactly one grain of the granules or a plurality of grains. The compressing of the powder results at least partially from the fact that the mutually assigned molding elements approach one another when they move toward the pressing area, in which the roller elements are arranged adjacently to one another.

A feed apparatus can feed the powder to the pressing area. Such a feed apparatus can have one or more dispensing openings from which the powder emerges for example under gravity and drops or trickles into the pressing area. In this case, the feed apparatus is arranged at least partially vertically above the pressing area. In addition, there may also be other possible ways of introducing the powder into the pressing area, for example spraying. However, gravity-supported feeding can be the simplest and most energy-efficient option. In some variations, the lateral surfaces move downward in the pressing area, with the result that the powder is conveyed downward between the roller elements in the pressing area and results in a continuous downward movement of the powder when the feed apparatus allows the powder to drop into the pressing area.

According to one form of the present disclosure, a cam mechanism deflects the molding elements of a first roller element radially depending on the angle of rotation. In other words, while the molding elements of the first roller element move during the rotation of the first roller element, they are deflected radially (with respect to the first axis of rotation) by the cam mechanism, specifically depending on the angle of rotation of the first roller element. Accordingly, a particular radial deflection of the particular molding element corresponds to a particular angle of rotation. The term "cam mechanism" should not be interpreted as being limiting here. The cam mechanism can be designed in particular such that the described deflection results from the rotary movement of the first roller element by force diversion. In other words, during the rotary movement, the molding elements are carried along, and during this guided movement, a force diversion takes place, which brings about the radial deflection. In general, the cam mechanism provides that the molding elements move on a path of movement that is not concentric with respect to the first axis of rotation. Depending on the configuration of the cam mechanism, the path of movement can also be noncircular. The molding elements are in this case arranged on a guide frame which is stationary in a radial direction and with respect to which they are radially deflectable. The guide frame on which the lateral surface of the first roller element can also be at least partially formed carries the molding elements along in a tangential direction, while allowing them to move in a radial direction. In particular, the molding elements can be guided on the guide frame in a radially displaceable manner.

In some variations the cam mechanism deflects the molding elements of the first roller element radially outward in the pressing area in order to support the compression of the powder. In other words, when the molding elements of the first roller element move toward the pressing area during the rotation of the first roller element, they are deflected (radially outward) by the cam mechanism. The deflection supports the compression of the powder, since the mutual approaching of the cooperating molding elements, which also occurs on account of the rotary movement of the roller elements, is enhanced when the (first) molding elements of the first roller element are deflected radially outward in the pressing area. As a result, the distance between the cooperating molding elements can be reduced, the mutual approaching thereof can be accelerated and/or a pressure acting on the powder can be increased.

In at least one variation, the lateral surfaces of the two roller elements can also be spaced apart from one another in the pressing area. In this case, there is a gap between the lateral surfaces, and under certain circumstances this can result in more powder trickling i.e., falling through between the roller elements. Therefore, it is desired that the lateral surfaces roll in contact with one another in the pressing area. In other words, the lateral surfaces bear at least partially against one another in the pressing area and roll in contact with one another during the rotary movement of the two roller elements. The lateral surfaces do not in this case have to be formed in a smooth or rotationally symmetric manner, but can also have a meshing structure. As a result, in some variations, one roller element can drive the other roller element.

According to one variation of the present disclosure, the cam mechanism has a cam element that is off-center with respect to a first axis of rotation of the first roller element and is arranged within the first roller element, the molding elements being radially deflected by said cam element. The cam element is formed or arranged in an off-center manner with respect to the first axis of rotation, i.e. in particular an outer surface, facing the molding elements, of the cam element is formed in an off-center manner. Thus, if the molding elements move in a tangential direction following the rotary movement of the first roller element, they are guided along the outer surface of the cam element, wherein, by force diversion, a radial deflection takes place when the molding elements approach the pressing area.

While the cam element is off-center with respect to the first axis of rotation, it can be formed in a rotationally symmetric manner with respect to a cam axis that is offset with respect to the first axis of rotation. Therefore, it is also formed concentrically with this cam axis. For example, the cam element can be formed in a wheel-like or roller-like manner, wherein the cam axis forms the axis of symmetry thereof. Optionally, the cam element can rotate about the cam axis synchronously with the first roller element. In other words, the cam element rotates in the same direction and at the same angular velocity within the first roller element.

In at least one variation, the first roller element has guide channels that extend radially inward with respect to the lateral surface thereof, the molding elements being guided within said guide channels and said guide channels receiving powder upon reaching the pressing area. The guide channels can be formed for example within the abovementioned guide frame. The guide channels extend radially inward, wherein they can extend in particular, although not necessarily, parallel to the radial direction. The cross section of the guide channels can be adapted in particular to a cross section of the respective molding element, such that the respective molding element bears in a flush manner within the guide channel. In addition to guiding the respective molding elements, the guide channels also serve to receive powder when the portion of the first roller element having the particular guide channel passes into the pressing area. This design is advantageous in particular when the two lateral surfaces of the roller elements roll in contact with one another, such that there is no gap between the roller elements in the pressing area. In this case, the guide channel serves as a receiving area for powder.

The apparatus can shape the granules in particular at least partially within the guide channels. In this case, it is possible for example for each particular guide channel to form a part of the abovementioned molding cavity for molding the granules. For example, the cavity can be bounded radially on the inside by the molding element of the first roller element and radially on the outside by the corresponding molding element of the second roller element, while there is bounding by the guide channel transversely to the radial direction, i.e. tangentially-axially. As a result of the outward radial deflection of the molding element, the powder that is located entirely or partially within the guide channel is compressed.

In some variations the cam mechanism deflects the molding elements radially outward after leaving the pressing area, in order to eject granules from the guide channels. "After leaving the pressing area" refers to the portion of the movement of the particular molding element in which it moves out of the pressing area. That is, after leaving the pressing area is the part of the rotary movement that (indirectly or directly) follows passage through the pressing area. If, as described above, an outward radial deflection takes place within the pressing area, this can be continued after the pressing area has been left. During the rotary movement, the distance between the first molding elements and the second molding elements increases after the pressing area has been left, such that the granules are no longer enclosed between the first and second molding elements. To some extent, the granules can drop out of the guide channels during the further rotary movement under their own weight. In at least one variation, however, as a result of the pressing operation, the granules stick to the guide channels and the corresponding adhesion of the granules to the guide channels is overcome when the molding element moves (further) radially outward, as described. As a result, the granules are pushed out of or ejected from the guide channel.

In at least one variation the residual powder is kept in the solid state during compression. In other words, no melting or fusion of the thermoplastic powder takes place during compression. The cohesion of an individual grain of the granules can in this case be based for example on a microscopic form fit between individual powder particles or on intermolecular forces between the surfaces of adjacent powder particles. This should not be interpreted as being limiting, however. Depending on the speed and intensity of the compression, considerable heating up of the powder can result, although in some variations this does not cause the melting temperature to be exceeded. In at least one variation there is no active heating of the powder, that is to say there is no heating by heating elements provided for this very purpose. In order to inhibit undesirably heating of the powder, parts of the pressing apparatus, in particular the molding elements, can be manufactured from a material with good thermal conductivity, for example a metal. Since melting and resolidification of the thermoplastic material generally impairs the material properties thereof, keeping the residual powder in the solid state during compression contributes toward providing granules having as high a quality as possible for the primary shaping process.

To provide the powder, a residual powder that arises during selective laser sintering can be used. During selective laser sintering (SLS), considerable quantities of residual powder that have only been partially sintered, if at all, remain after the additive manufacture of a workpiece by sintering powder by means of a laser beam. It has been shown that, even though it is unsuitable for reuse in an SLS process, this residual powder can be used in the manner according to the teachings of the present disclosure for producing granules, which then serve as raw material for a primary shaping process.

In some variations of the present disclosure, the residual powder is mixed with at least one additive to provide the powder. The additive can be present in particular likewise in the form of a powder. This can be a likewise at least partially thermoplastic additive, but could also be a non-thermoplastic substance, for example a filler or a pigment. Under certain circumstances, it is also possible for a liquid additive to be admixed to the residual powder, although this should be in a small quantity.

In at least one variation, considerable quantities of an additive can be used, such that, under certain circumstances, it can make up a greater share of the powder than the residual powder. However, at the same time, it is also possible for residual powder to be used in a completely pure form or virtually pure form to produce the granules. According to one variation, a powder is provided that has a weight proportion of at least 95% residual powder. In other words, the at least one additive corresponds to a weight proportion of at most 5%.

The (at least partially thermoplastic) granules that are produced can be used in particular as raw material for primary shaping processes in plastics processing, such as injection molding, transfer molding, extrusion, blow molding or the like. In some variations the granules are used as raw material for an injection-molding process. Various residual powders that arise in additive manufacturing processes such as selective laser sintering can be used with or without admixture of an additive as materials in injection molding when they have been compressed into granules in the manner according to the teachings of the present disclosure.

In some variations, before the powder is provided, at least a first separating operation is carried out in order to separate off a share of a bulk residual powder that is reusable in the additive manufacturing process. The separation can take place according to various criteria, for example according to an effective grain size. In this case, particles that are smaller than a particular grain size can be separated off and reused in the additive manufacturing process. By contrast, larger particles or agglomerates, with which it is not possible to build up planar powder layers, can be compressed according to the teachings of the present disclosure into granules. During separation according to grain sizes, the residual powder can be screened. However, separation of the residual powder according to other criteria, for example according to the specific weight of the powder particles, among others are included within the teaching of the present disclosure.

Alternatively or additionally, after the compression, at least one second separating operation is carried out in order to separate loose powder from the granules. For example, in some variations all of the powder that is fed for example by the abovementioned feed apparatus is not compressed completely into granules. In other words, residual loose, uncompressed powder remains, which can first of all be mixed with the granules. This can be undesirable since the powder contaminates the granules to some extent and can impair the utility thereof. The second separating process can take place in particular by means of a separating apparatus that is arranged beneath the roller elements and collects the granules and the powder and separates them from one another. If the separating apparatus has a screen, the screen can be set into vibration. Where it is a matter of separating granules and powder here, in some variations the separation may not be complete, wherein for example small amounts of powder can remain stuck to the granules. This is generally irrelevant for a subsequent use of the granules, however.

The powder separated off can be at least partially returned and compressed into granules. This can take place using a return device that returns the powder separated off for example to a storage container of the feed apparatus. The return device can have different parts or portions that are based on different conveying principles. For example, the powder can be guided on conveyor belts. In particular, the powder can be guided within corresponding lines by an air current. In other words, an air current is generated, which carries along the powder. For example, a negative pressure can be generated by the storage container of the feed apparatus, the powder being drawn in by said negative pressure.

In another form of the present disclosure, a method for treatment of a residual thermoplastic powder from an additive manufacturing process includes feeding a powder to a pressing area of an apparatus, the powder including the residual thermoplastic powder. The apparatus includes two roller elements that are drivable in opposite directions and have lateral surfaces adjacent to one another in the pressing area. The lateral surfaces each have a plurality of molding elements assigned to one another in pairs. The apparatus also includes a cam mechanism configured to deflect the plurality of molding elements of one of the two roller elements radially as a function of an angle of rotation of the one of the two roller elements. The two roller elements are rotated in opposite directions such that the powder fed into the pressing area is compressed in granules by the plurality of molding elements assigned to one another in pairs.

In some variations, the method includes deflecting the plurality of molding elements of one of the two roller elements radially outward in the pressing area using the cam mechanism such that the powder is compressed by the plurality of molding elements of the one of the two roller elements.

In at least one variation the two roller elements are a first roller element and a second roller element, and the cam mechanism has a cam element that is off-center with respect to a first axis of rotation of the first roller element and is arranged within the first roller element. Also, the plurality of molding elements of the first roller element are radially deflected by the cam element. In some variations the method includes deflecting the plurality of molding elements of the one of the two roller elements radially outward after leaving the pressing area using the cam mechanism such that the granules are ejected from the guide channels.

In some variations the method includes separating non-compressed powder from the granules and compressing the non-compressed powder into additional granules.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the different figures, identical parts are always provided with the same reference signs, for which reason these parts are generally also described only once.

DETAILED DESCRIPTION

Figure 1:
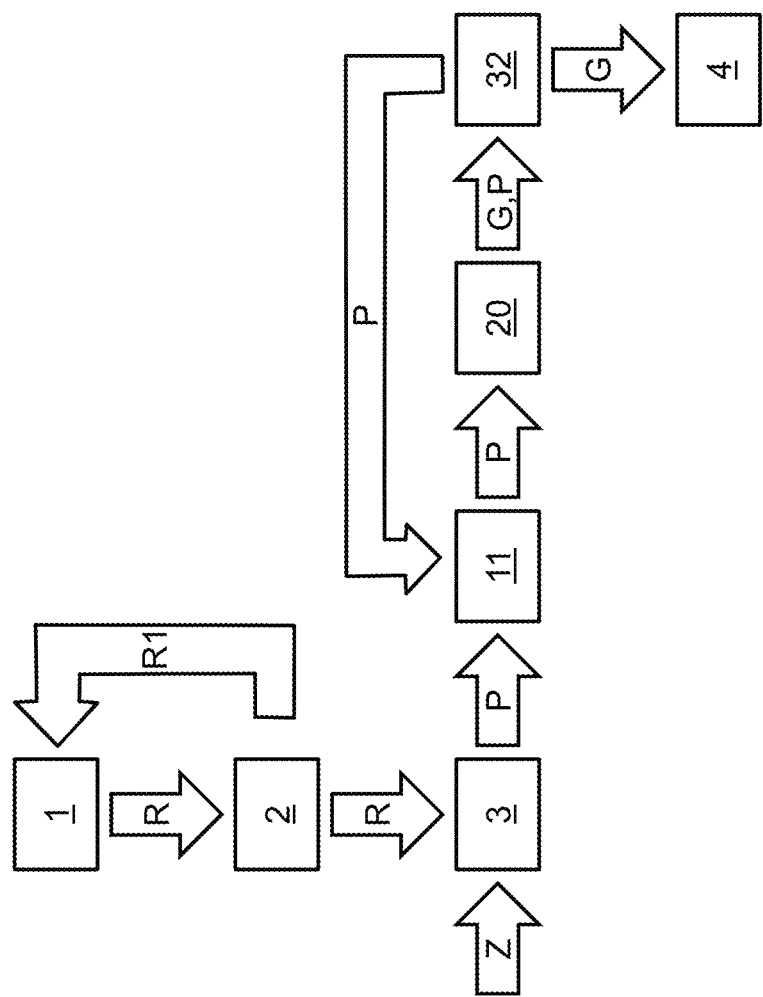
FIG. 1 shows a block diagram of a process according to the teachings of the present disclosure.

The following description is merely exemplary in nature and is not intended to limit the present disclosure, application, or uses. It should be understood that throughout the drawings, corresponding reference numerals indicate like or corresponding parts and features.

FIG. 1 shows a block diagram of a process according to one form of the present disclosure. For example, a workpiece (not shown) is manufactured by selective laser sintering (SLS) in an SLS plant 1. To this end, a thermoplastic powder is used, which may be for example a polyamide filled with glass fibers. Residual powder R that remains after manufacture (i.e., a bulk residual powder) is fed to a first screen 2, where a share R1 of the residual powder R is separated off that can be reused in SLS and is returned. This first separating operation is optional.

Figure 2:
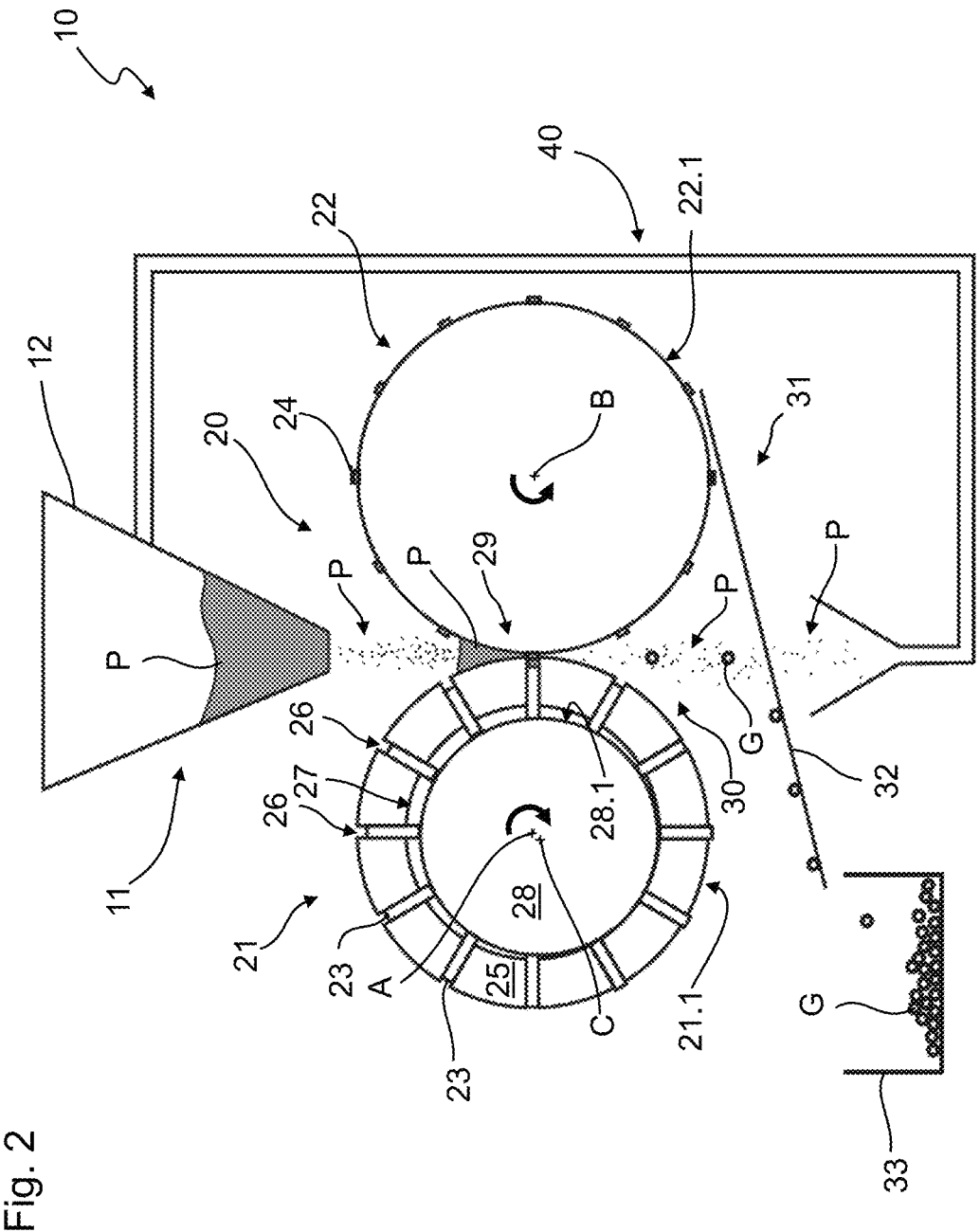
FIG. 2 shows a schematic illustration of a device that can be used in the process according to the teachings of the present disclosure.

That residual powder R that cannot be reused is fed, together with at least one additive Z (for example a further thermoplastic powder, a pigment, a filler or the like), to a mixer 3, where a powder P is mixed that is used in the further process steps. This process step is likewise optional and the powder P subsequently used can also consist exclusively of residual powder R. Otherwise, the powder P can have for example a weight proportion of at least 95% residual powder R, although other weight proportions are also possible. The powder P is filled into a storage container 12 of a feed apparatus 11, which is part of the apparatus 10 illustrated in FIG. 2. The feed apparatus 11 is arranged above a pressing apparatus 20, which has a first roller element 21 and a second roller element 22. The roller elements 21, 22 are rotatable about a first and second axis of rotation A, B, which extend horizontally and parallel to one another, wherein a drive (not illustrated here) provides synchronous rotation in opposite directions. The feed apparatus 11 feeds the powder P to a pressing area 29 by allowing it to trickle or fall into the pressing area 29 under gravity.

Figure 3:
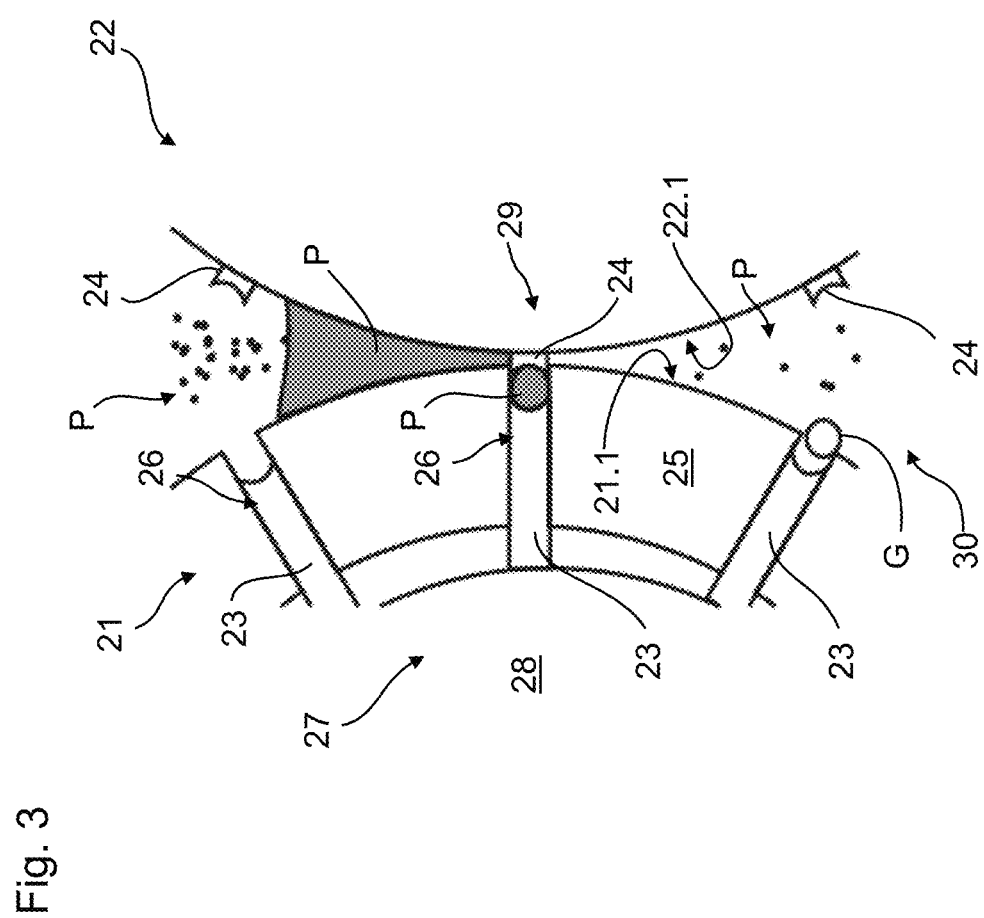
FIG. 3 shows an enlarged detail view of FIG. 2.

Lateral surfaces 21.1, 22.1 (FIG. 3) of the roller elements 21, 22, respectively, roll in contact with one another in the pressing area 29. The two roller elements 21, 22 have a plurality of molding elements 23, 24 in the region of their lateral surfaces 21.1, 22.1 (FIG. 3). First molding elements 23 of the first roller element 21 are accommodated in a guide frame 25, within which they are displaceable radially with respect to the first axis of rotation A. Each first molding element 23 is in this case arranged in a radially extending guide channel 26 within the guide frame 25, the cross section of which is coordinated with the cross section of the molding element 23. The guide frame 25 also forms the first lateral surface 21.1 (FIG. 3) of the first roller element 21. In each case one first molding element 23 is assigned to a second molding element 24 of the second roller element 22 and cooperates therewith in the pressing area 29 in order to compress powder P into granules G. The second molding elements 24 are arranged in a fixed position on the second roller element 22 and project radially somewhat beyond the second lateral surface 22.1 (FIG. 3) of the second roller element 22.

Arranged within the first roller element 21 is a roller-like cam element 28, which is formed or positioned in an off-center manner with respect to the first axis of rotation A but in a rotationally symmetric manner with respect to a cam axis C parallel to the first axis of rotation A. The cam element 28, which belongs to a cam mechanism 27, cooperates with the first molding elements 23 and deflects the first molding elements 23 radially depending on the angle of rotation of the first roller element 21. In this case, the first molding elements 21 can be preloaded radially inward for example by spring elements that are not illustrated here. During their movement, they therefore follow the external contour 28.1 of the cam element 28. Before and upon reaching the pressing area 29, each particular first molding element 23 is retracted into the guide channel 26.

As can be seen in FIG. 3, the guide channel 26 in the process also receives powder P. During the further rotary movement of the roller elements 21, 22, the respectively assigned second molding element 24 engages in the guide channel 26 and thus closes the guide channel 26 toward or from the outside. The powder P contained in the guide channel 26 is compressed into granules G between the first molding element 23 and the second molding element 24, wherein the pressure desired for this purpose is applied both by the mutual approaching of the molding elements 23, 24 in accordance with the rotary movement of the roller elements 21, 22 and by the first molding element 23 being deflected radially outward by the cam element 28 in the pressing area 29. The compression takes place without active heating up of the powder P. If heating up occurs as a side effect of friction and compression, the heating does not result in melting the powder P and/or the residual powder R.

After leaving the pressing area 29, the first and second molding elements 23, 24 move apart, with the result that the granules G are released. In some variations, the granules G can be released from the guide channel 26 and drop out under gravity during the further rotation of the first roller element 21. In the alternative, or in addition to, the first molding elements 23 are deflected further radially outward by the cam element 28 after the pressing area 29 has been left, with the result that the first molding elements 23 eject the granules G in a dispensing area 30. The granules G drop downward together with non-compressed powder P under gravity to a separating apparatus 31, which has a second screen 32 in the example illustrated. The grains of the granules G are retained by the screen 32 and, on account of the inclined position of the screen 32, pass into a container 33, while the particles of the powder P fall through the screen 32. The particles of the powder P are guided back to the storage container 12 by a return apparatus 40 and are subsequently compressed into granules G. The return apparatus 40 is illustrated only schematically here and can have for example a system of pipes in which the powder P is sucked to the storage container 12 by a negative pressure.

The finished granules G can subsequently be used as raw material for various primary shaping processes in plastics processing. In the example in FIG. 1, they are used in an injection-molding apparatus 4.

LIST OF REFERENCE SIGNS

1 SLS plant
2, 32 Screen
3 Mixer
4 Injection-molding apparatus
10 Apparatus
11 Feed apparatus
12 Storage container
20 Pressing apparatus
21, 22 Roller element
21.1, 22.1 Lateral surfaces
23, 24 Molding element
25 Guide frame
26 Guide channel
27 Cam mechanism
28 Cam element
28.1 External contour
29 Pressing area
30 Dispensing area
31 Separating apparatus
33 Container
40 Return apparatus
A, B Axis of rotation
C Cam axis
G Granules
P Powder
R Residual powder
R1 Share
Z Additive Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for treatment of residual thermoplastic powder from an additive manufacturing process, the method comprising:
   providing a powder that consists of a residual thermoplastic powder; and
   compressing the powder into granules as raw material for a primary shaping process.

2. The method according to claim 1, wherein the residual thermoplastic powder is kept in a solid state during compressing of the powder.

3. The method according to claim 1, wherein the residual thermoplastic powder is provided from a selective laser sintering process.

4. The method according to claim 1 further comprising using the granules as raw material for an injection-molding process.

5. The method according to claim 1 further comprising separating a portion of bulk residual thermoplastic powder that is reusable in the additive manufacturing process from the residual thermoplastic powder included in the powder before compressing the powder into granules using a first separating operation.

6. The method according to claim 5 further comprising separating non-compressed powder from the granules using a second separating operation.

7. The method according to claim 6 further comprising compressing the non-compressed powder into granules.

8. The method according to claim 1, wherein the powder is compressed into the granules with a pressing apparatus comprising two roller elements rotating in opposite directions and having lateral surfaces adjacent to one another in a pressing area, the lateral surfaces each having a plurality of molding elements assigned to one another in pairs such that powder is compressed into granules in the pressing area.

9. The method according to claim 8, wherein the two roller elements are drivable in opposite directions.

10. The method according to claim 9, wherein the pressing apparatus comprises a cam mechanism configured to deflect the plurality of molding elements of one of the two roller elements radially as a function of an angle of rotation of the one of the two roller elements and the powder is compressed into the granules by the plurality of molding elements assigned to one another in pairs.

11. The method according to claim 10, wherein the powder is compressed into the granules by the radial deflection of the plurality of molding elements of the one of the two roller elements.

12. The method according to claim 10 further comprising deflecting the plurality of molding elements of the one of the two roller elements radially outward in the pressing area using the cam mechanism such that the powder is compressed by the plurality of molding elements of the one of the two roller elements.

13. The method according to claim 10, wherein the two roller elements comprise a first roller element and a second roller element, and the cam mechanism has a cam element that is off-center with respect to a first axis of rotation of the first roller element and is arranged within the first roller element, wherein the plurality of molding elements of the first roller element are radially deflected by the cam element.

14. The method according to claim 13, wherein the first roller element has guide channels that extend radially inward with respect to the lateral surface of the first roller element and the plurality of molding elements of the first roller element are guided within the guide channels.

15. A method for treatment of a residual thermoplastic powder from an additive manufacturing process, the method comprising:
    feeding a powder to a pressing area of an apparatus, wherein the powder consists of the residual thermoplastic powder and the apparatus comprises:
        two roller elements, wherein the two roller elements are drivable in opposite directions and have lateral surfaces adjacent to one another in the pressing area, the lateral surfaces each having a plurality of molding elements assigned to one another in pairs; and
        a cam mechanism configured to deflect the plurality of molding elements of one of the two roller elements radially as a function of an angle of rotation of the one of the two roller elements; and
    rotating the two roller elements in opposite directions such that the powder fed into the pressing area is compressed in granules by the plurality of molding elements assigned to one another in pairs.

16. The method according to claim 15 further comprising deflecting the plurality of molding elements of one of the two roller elements radially outward in the pressing area using the cam mechanism such that the powder is compressed by the plurality of molding elements of the one of the two roller elements.

17. The method according to claim 15, wherein the two roller elements comprise a first roller element and a second roller element, and the cam mechanism has a cam element arranged within the first roller element and arranged off-center with respect to a first axis of rotation of the first roller element, wherein the plurality of molding elements of the first roller element are radially deflected by the cam element.

18. The method according to claim 15 further comprising deflecting the plurality of molding elements of the first roller element radially outward after leaving the pressing area using the cam mechanism such that the granules are ejected from the first roller element.

\* \* \* \* \*